US012380062B1

(12) United States Patent
Rao et al.

(10) Patent No.: US 12,380,062 B1
(45) Date of Patent: Aug. 5, 2025

(54) DATA SET MANAGEMENT USING DATA SET LINEAGE METADATA

(71) Applicant: Amazon Technologies, Inc., Seattle, WA (US)

(72) Inventors: Karthik Ravindra Rao, Sunnyvale, CA (US); Raghu Chaitanya Puligilla, Hyderabad (IN); Enrico Sartorello, Berlin (DE); Michal Marshall, Seattle, WA (US); Ameer Nizarsami Ayoub, Seattle, WA (US); Kalpesh N Sutaria, Redmond, WA (US); Paul Matthew Kohan, Seattle, WA (US); Vivek Bhadauria, Redmond, WA (US); Rama Krishna Sandeep Pokkunuri, Redmond, WA (US); Hammad Latif Mirza, Seattle, WA (US); Kshitiz Mohan Agarwal, Kirkland, WA (US); Yong Yuan, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 294 days.

(21) Appl. No.: 17/364,839

(22) Filed: Jun. 30, 2021

(51) Int. Cl.
  *G06F 16/10* (2019.01)
  *G06F 16/11* (2019.01)
  *G06N 20/00* (2019.01)

(52) U.S. Cl.
  CPC .......... *G06F 16/122* (2019.01); *G06N 20/00* (2019.01)

(58) Field of Classification Search
  CPC .............................. G06F 16/122; G06N 20/00
  See application file for complete search history.

(56) References Cited

U.S. PATENT DOCUMENTS

| | | | |
|---|---|---|---|
| 9,652,485 B1 | 5/2017 | Bhargava et al. | |
| 10,977,235 B2 | 4/2021 | Paraschivescu | |
| 11,341,097 B2* | 5/2022 | Leite Pinheiro de Paiva | ............. G06F 16/9574 |
| 11,755,536 B1* | 9/2023 | Pushkin ................ | G06F 16/219 707/803 |
| 2004/0193952 A1* | 9/2004 | Narayanan ............ | G06F 16/273 714/13 |
| 2009/0012983 A1* | 1/2009 | Senneville ............ | G06F 16/256 |
| 2014/0089265 A1* | 3/2014 | Talagala ................. | G06F 16/22 707/674 |

(Continued)

*Primary Examiner* — Belix M Ortiz Ditren
(74) *Attorney, Agent, or Firm* — Robert C. Kowert; Kowert, Hood, Munyon, Rankin & Goetzel, P.C.

(57) ABSTRACT

A data set management of a provider network may allow a user to create new data set instances. When a data set instance is created, data set lineage metadata is also generated to describe the new data set instance, including the transformation that was applied to data in order to create the data set instance. When modifications are made to source data (e.g., a data bucket), then the modifications are propagated via transformations to the parent data set instance and to any child data set instances according to the data set lineage metadata in order to update the data set instances. When modifications are made to a parent data set instance to create an updated parent data set instance, then the modifications are propagated via transformations to any child data set instances according to the data set lineage metadata. Transformations and transformation patterns may also be defined and scheduled.

20 Claims, 12 Drawing Sheets

(56) References Cited

U.S. PATENT DOCUMENTS

| | | | |
|---|---|---|---|
| 2014/0279979 A1* | 9/2014 | Yost ..................... | G06F 16/219 |
| | | | 707/798 |
| 2015/0012478 A1* | 1/2015 | Mohammad .......... | G06F 16/254 |
| | | | 707/602 |
| 2015/0363454 A1* | 12/2015 | Montejo Ayala ... | G06F 16/2336 |
| | | | 707/694 |
| 2020/0210427 A1* | 7/2020 | Dugan ................ | G06F 21/6218 |
| 2021/0406320 A1* | 12/2021 | Nahamoo ............. | G06F 40/247 |
| 2022/0253699 A1* | 8/2022 | Hoshen ................... | G06N 3/08 |

* cited by examiner

DATA SET MANAGEMENT USING DATA SET LINEAGE METADATA

BACKGROUND

As various computing applications become more sophisticated and widespread, the ability to efficiently collect, organize, and analyze data becomes more important. For example, various types of machine learning models will generate higher quality results as various types of training data is made available to them. Organizing and manipulating large quantities of data can be quite a challenging process. A data scientist may spend a large amount of time collecting data and modifying a large volume of collected data in order to generate high quality machine learning models that produce results with a high degree of confidence or accuracy. However, managing different data sets and modifying training data across numerous data sets can be an extremely time-consuming and error-prone process.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement data set management using data set lineage metadata, according to some embodiments. In embodiments, managing data sets using data set lineage metadata may reduce the amount of time and/or computing/storage resources used to maintain and update large volumes of data, compared to other techniques. Embodiments may leverage data set lineage metadata to structure data in a way that allows for automatically propagating data modifications to any number of different groups of data. Therefore, embodiments may reduce the number of errors and allows users to organize and update numerous data sets in a much more efficient manner, compared to traditional techniques of managing data.

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 10 and described below.

This specification begins with a description of generating and updating different data set instances based on data set lineage metadata. A system for implementing data set management using data set lineage metadata is also discussed. A number of different methods and techniques to implement data set management using data set lineage metadata are discussed, some of which are illustrated in accompanying flowcharts. Finally, a description of an example computing system upon which the various components, modules, systems, and/or techniques described herein may be implemented is provided. Various examples are provided throughout the specification.

Figure 1:
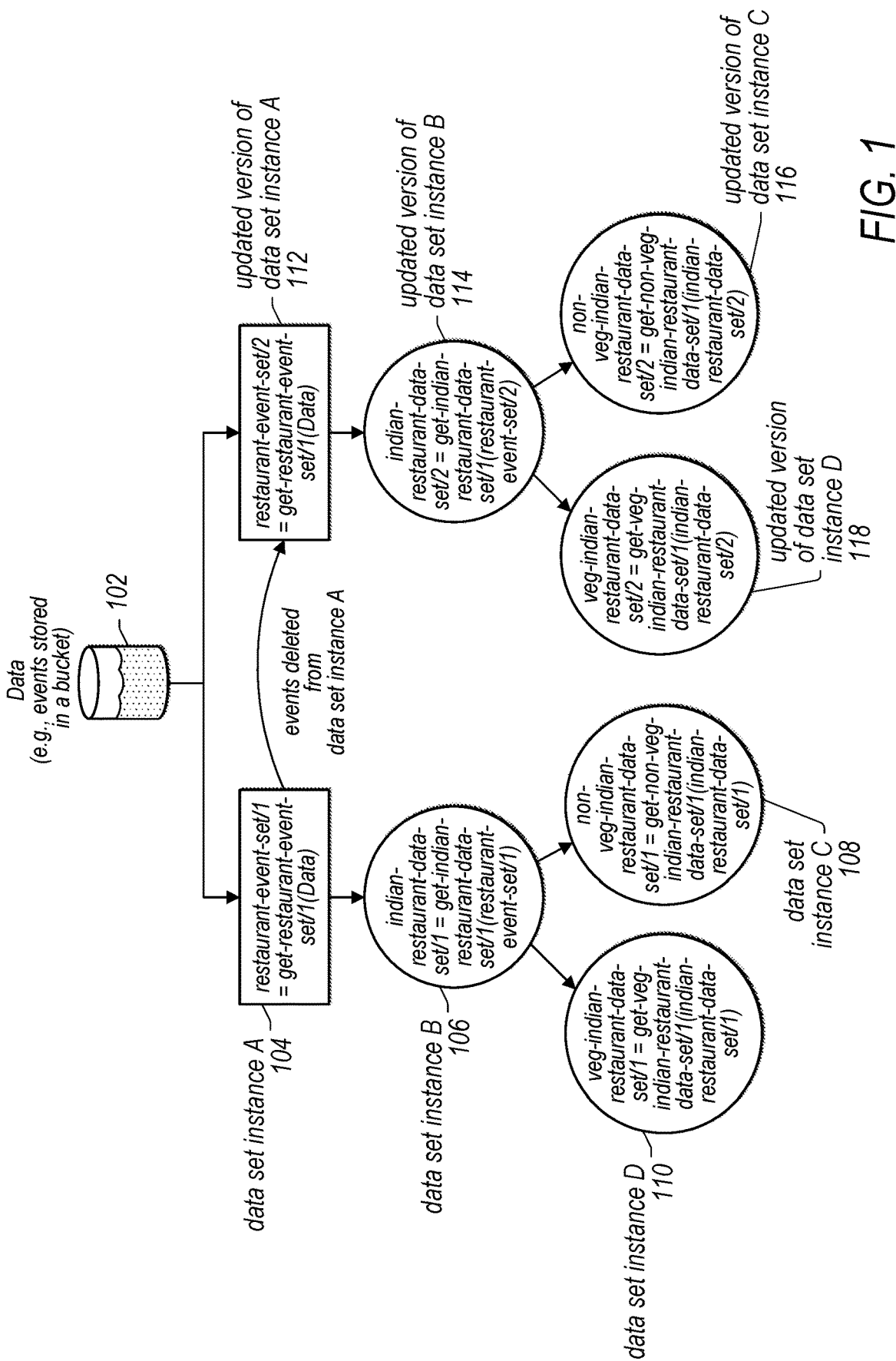
FIG. 1 illustrates an example of updating multiple data set instances based on data set lineage metadata, according to some embodiments.

FIG. 1 illustrates an example of updating multiple data set instances based on data set lineage metadata, according to some embodiments.

Figure 4:
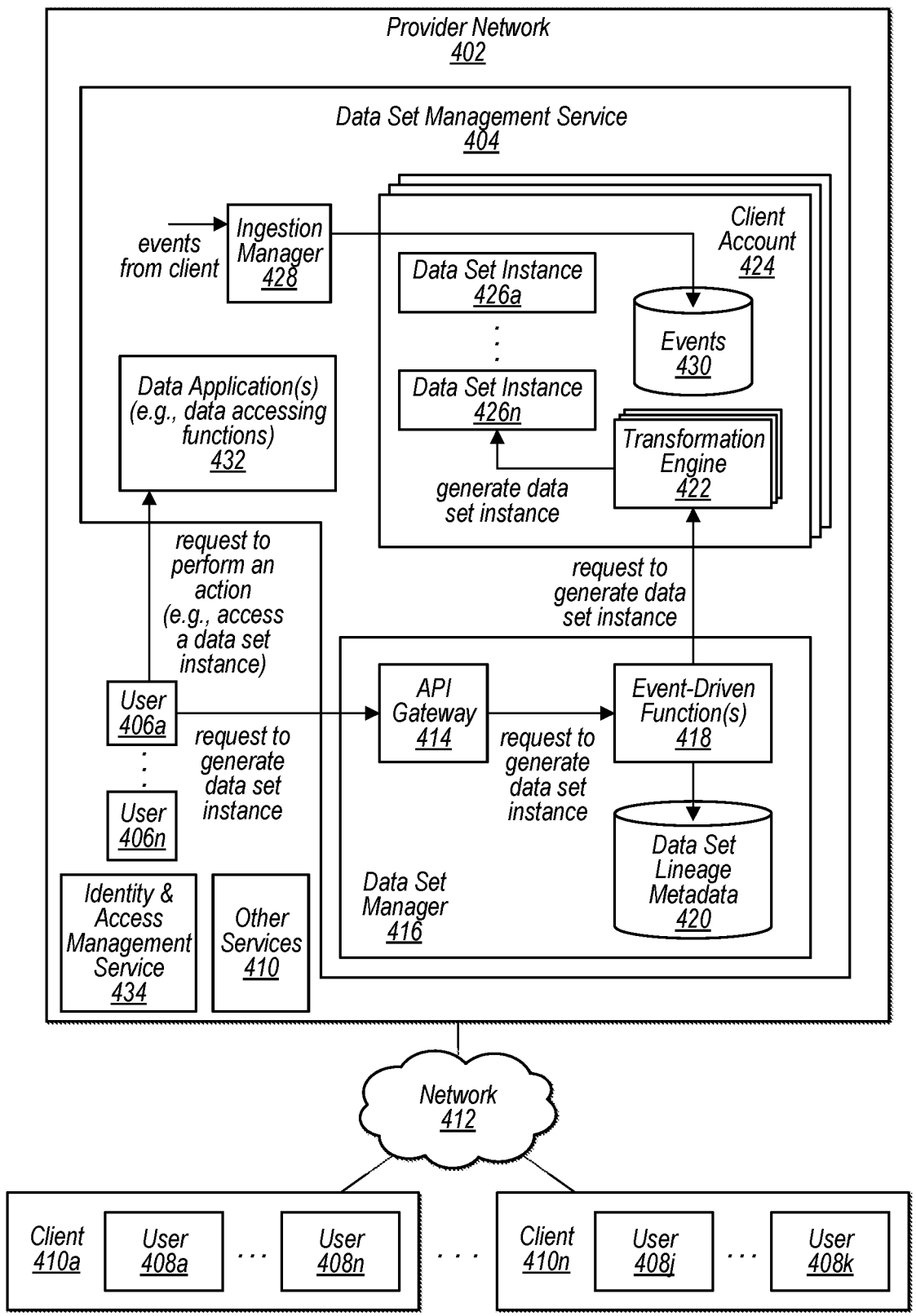
FIG. 4 is a logical block diagram illustrating a system for data set management using data set lineage metadata, according to some embodiments.

In the depicted example, data 102 is stored at a data storage location. In embodiments, the data may be stored at any suitable storage location of a computing and/or storage system. For example, the data may be stored in a bucket (e.g., a memory location(s) where a collection of data may be stored) of a provider network, as shown in FIG. 4.

Figure 3:
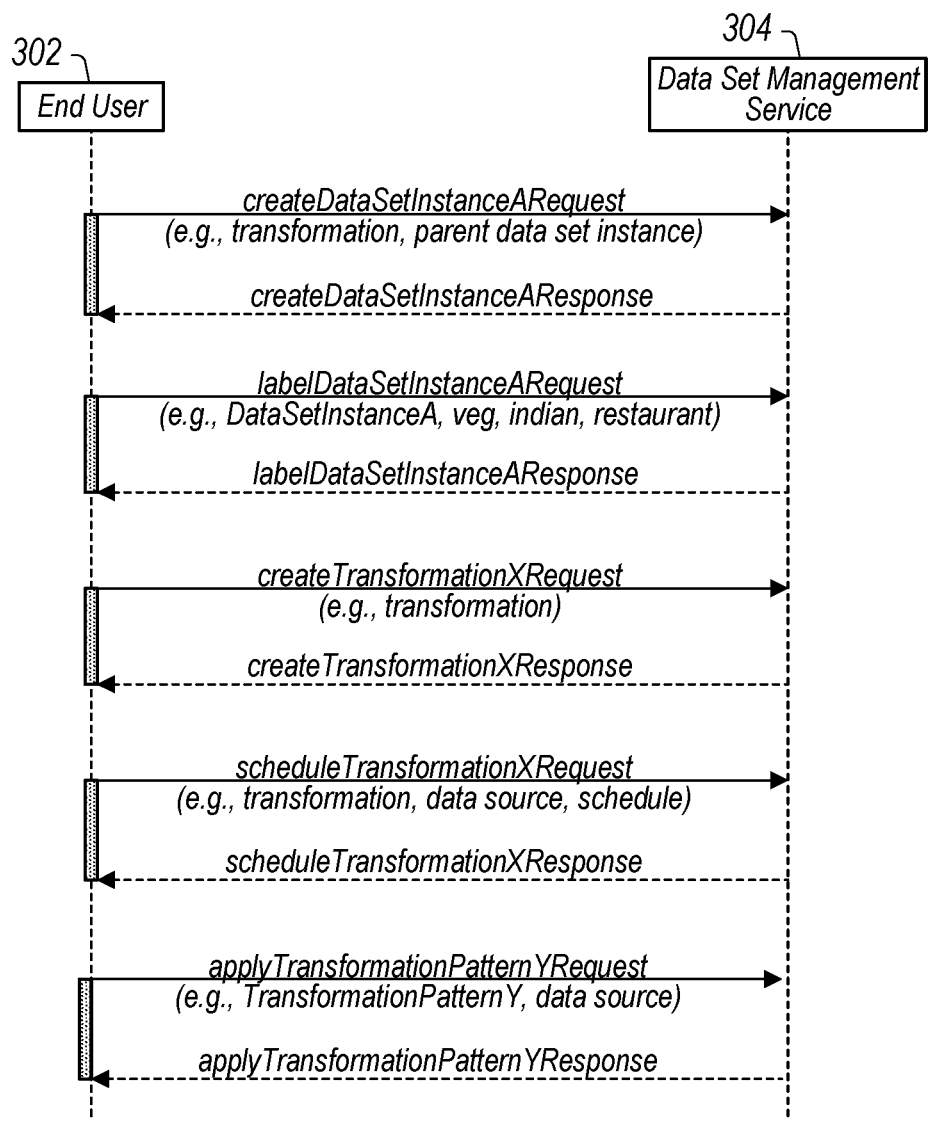
FIG. 3 illustrates examples of actions performed by a user for data set management, according to some embodiments.

In embodiments, a computing system provides a data set management service (e.g., any number of applications and/or functions) that allows users to perform data set management tasks, some of which are described herein (e.g., data set management service of the provider network of FIG. 3). In various embodiments, the data 102 may be associated with a client of the data set management service (e.g., a user/client at a remote network or at the local network). A user (or other source, such as hardware and/or a software application) may provide the data to the service and the service may store the data at a storage location (e.g., resulting in new or updated data at the storage location). In some embodiments, one or more new events (e.g., one or more portions of data and/or metadata) may be sent to the service and the one or more new events may be added to the data, resulting in updated data that includes the one or more new events.

In embodiments, the service may perform extract, transform, and load (ETL) processing to the data before storing it to the storage location. The data obtained from the client may include any number of structured and/or semi-structured data items that each have an identifier of the data item. In some embodiments, the service may perform the ETL processing on the data obtained from the client to perform at add at least some of the structure to the data (e.g., split the data into different data items and/or assign identifiers to each of the data items).

For example, the service may obtain any number of events associated with a client. An event may be a single data item of the data that is obtained from the client and/or stored at the storage location as part of the data. In embodiments, each event may include an identifier (event ID) that uniquely identifies the event with respect to any other events (e.g., an immutable primary identifier). An event may be data associated with any type of application. As an example, one type of event may be an "utterance," which may include words that were spoken by a user of a chatbot application that accepts speech input. A client that owns and/or manages the chatbot application may wish to use the data set management service in order to store, organize, and/or modify events and use the events as training data to improve the quality of machine learning models of the chatbot application that analyze speech input.

In the depicted example, the data 102 is stored by a data management service and may include any number of events associated with a client. The service may receive from a user associated with the client (e.g., one of a plurality of data scientists of a company that develops a chatbot application), a request to generate a data set instance. The request may indicate a transformation (e.g., query and/or script) to be performed on the data 102.

In response to the request, the service performs the transformation named "get-restaurant-event-set/1" on the obtained data to generate a current version of the data set instance named "restaurant-event-set/1" (data set instance A 104). As implied by the name of the transformation and the data set instance, the transformation may generate data set instance A by selecting any events of data 102 that are identified as restaurant-related events (e.g., an utterance that occurred at a restaurant). For example, each of the restaurant-related events may be selected by the service in response to identifying data and/or metadata of the event indicating the event occurred at a restaurant and/or indicating that the event is categorized as a restaurant event. In embodiments, the data 102 may include any number of events that are not selected because those events do not include the data and/or metadata indicating the event occurred at a restaurant and/or indicating that the event is categorized as a restaurant event.

In response to the request, the service may also generate data set lineage metadata. As shown, the data set lineage metadata may indicate that the current version of the data set instance (data set instance A 104) is derived from the obtained data 102 "Data" based on the transformation "get-restaurant-event-set/1."

In the example embodiment, the service may receive from the user (or another user of the client), another request to generate a child data set instance. The other request may indicate another transformation "get-indian-restaurant-data-set/1" to be performed on the current version of the data set instance "restaurant-event-set/1" that was generated as describe above (data set instance A 104). In response to the other request, the service performs the other transformation "get-indian-restaurant-data-set/1" on data set instance A 104 to generate a current version of the child data set instance named "indian-restaurant-data-set/1" (data set instance B 106).

In response to the other request, the service may also add, to the data set lineage metadata, an indication that the current version of the child data set instance (data set instance B 106) is derived from data set instance A 104 based on the other transformation. As shown, the data set lineage metadata may indicate that the current version of the child data set instance (data set instance B 106) is derived from data set instance A 104 based on the other transformation "get-indian-restaurant-data-set/1."

In embodiments, any number of additional levels/generations of child data sets (and data set lineage metadata for each child data set) may be generated in the same or similar manner as described above. For example, in response to a user request, data set instance C 108 is generated as a child of data set instance B 106, and the corresponding metadata is added to the data set lineage metadata (shown as metadata that indicates data set instance C is derived from data set instance B based on the transformation "get-non-veg-indian-restaurant-data-set/1").

In the same/similar way, data set instance D 110 is generated as another child of data set instance B 106, and the corresponding metadata is added to the data set lineage metadata. In the depicted example, the metadata shown within the circle corresponding to data set instance D indicates that data set instance D is derived from data set instance B based on the transformation "get-veg-indian-restaurant-data-set/1." Similarly, other examples of data set lineage metadata are shown within other circles/rectangles that correspond to other data set instances in FIGS. 1 and 2.

Figure 2:
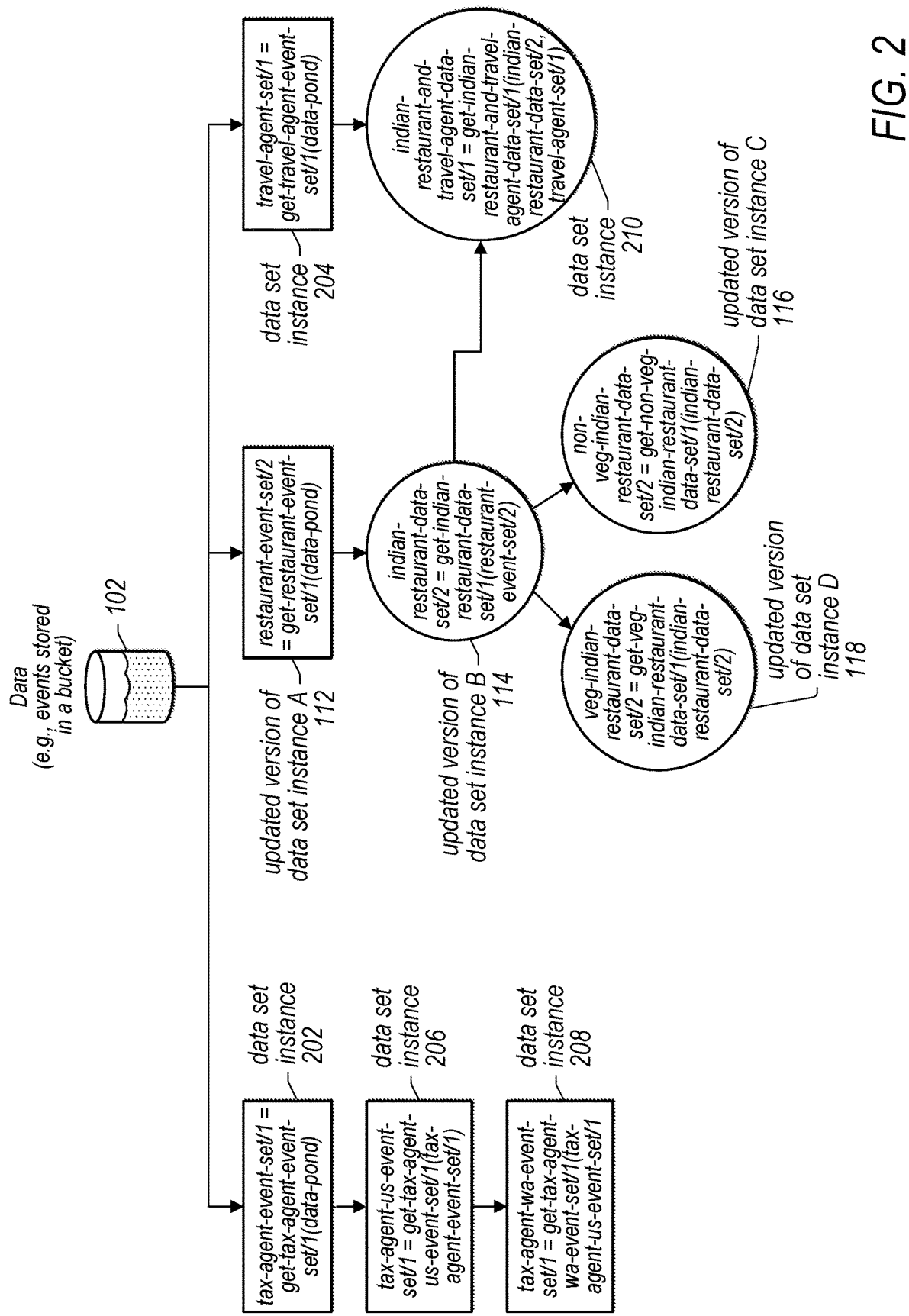
FIG. 2 illustrates an example of generating data set instances and data set lineage metadata for the data set instances, according to some embodiments.

In various embodiments, the service may generate any number of data set instances at any number of levels (e.g., generations) and corresponding data set lineage metadata in response to any number of requests from one or more users. For example, FIG. 2 shows another top-level data set named "tax-agent-event-set/1" and another top-level data set named "travel-agent-set/1." In embodiments, data set instance A may have any number of child data sets (e.g., based on different respective transformations applied to data set instance A), each of those child data sets may have any number of their own child data sets, etc. to any number of levels.

As shown, the service may receive a request to delete particular events (e.g., any number of events) from data set instance A. In embodiments, the request may indicate one or more event identifiers that each indicate an event to be deleted. In some embodiments, the request may indicate a range of event identifiers that each indicate multiple events to be deleted (e.g., events 1001-1301). In embodiments, the service may receive a request to add one or more events (each added event may include a unique identifier as metadata).

In various embodiments, the service may also receive a request to append data (e.g., metadata such as annotations provided by algorithms or humans) to one or more events. The request may indicate one or more event identifiers that each indicate an event in which data is to be appended to. The service may append the data to those events that correspond to the event identifiers (e.g., events that includes the indicated identifiers as metadata).

In response to receiving a request, the service may modify data set instance A to generate an updated version of data set instance A 112 (restaurant-event-set/2) that does not have the particular events (since they were deleted). The service may then generate an updated version of all the child data sets (e.g., at every level/generation) based on the updated version of data set instance A according to the data set lineage metadata (e.g., in a cascading manner that propagates along each level). For example, the service may identify, based on the data set lineage metadata, the transformation (get-indian-restaurant-data-set/1) to be performed on the updated version of data set instance A to generate the updated version of data set instance B 114 (indian-restaurant-data-set/2). In embodiments, the updated version of data set instance B 114 will not have data based on the deleted events.

In embodiments, the same/similar process may then be performed to generate the updated version of data set instance C 116 and to generate the updated version of data set instance D 118 (e.g., re-running the transformations "get-non-veg-indian-restaurant-data-set/1" and "get-veg-indian-restaurant-data-set/1" on the updated version of data set instance B 114). In embodiments, by leveraging the data set lineage metadata that was initially created when the data sets were generated, any changes (e.g., deleting events, adding events, and/or modifying data of events) made to a parent data instance (or the data 102 itself) may be automatically propagated to each child data set instance by performing the transformations indicated in the data set lineage metadata. This may drastically simplify the work required to maintain compliance for data (e.g., compliance with a data regulation such as general data protection regulation (GDPR)).

In some embodiments, the current version (e.g., original version) data set instances (e.g., data set instance A 104, data set instance B 106, data set instance C 108, and data set instance D 110) are inaccessible to the user subsequent to the generation of the updated versions of the data set instances (e.g., updated version of data set instance A 112, updated version of data set instance B 114, updated version of data set instance C 116, and updated version of data set instance D 118). In embodiments, making previous versions of data sets inaccessible (e.g., via deletion) may prevent outdated, sensitive/confidential, and/or incorrect data from being used.

As depicted, the data set lineage metadata may be stored/maintained as a directed acyclic graph (DAG). In embodiments, a node of the graph is represented as a tuple of the parent data set instance and the transformation performed on the parent. Edges represent the relationship between nodes. For example, in A→B, the edge denotes that A is the parent data set instance and that data set instance B is derived from data set instance A. As described for FIG. 2, embodiments may support using multiple nodes as parents.

FIG. 2 illustrates an example of generating data set instances and data set lineage metadata for the data set instances, according to some embodiments.

As described for FIG. 1, the data set management service has generated the updated version of data set instance A 112, the updated version of data set instance B 114, the updated version of data set instance C 116, and the updated version of data set instance D 118.

As shown, in response to user requests, the service has also generated top-level data set instance 202, top-level data set instance 204, child data set instance 206, and child data set instance 208. These data set instances may be generated in the same/similar manner as described in FIG. 1 for the other data set instances.

In embodiments, the service may receive a request to generate a data instance that has two or more parents. For example, the request may indicate a particular transformation (get-indian-restaurant-and-travel-agent-data-set/1) to be performed on the data set instance 204 and the updated version of data set instance B 114 to generate the child data set instance 210. In response to the request, the service performs the particular transformation on the data set instance 204 and the updated version of data set instance B 114 to generate the child data set instance 210.

In response to the request, the service may also add, to the data set lineage metadata, an indication that the child data set instance 210 is derived from both data set instance 204 and the updated version of data set instance B 114 based on the particular transformation. In response to any data modification of any of its parent nodes, the service may generated an updated version of the data set instance 210 according to the data set lineage metadata in the same or similar manner as described above (e.g., by re-running the particular transformation on its parent data set instances).

In embodiments, a user (e.g., user 106a) may send a request to a data set management service (e.g., using an application programming interface (API)) to perform any of the functions/actions described herein. For example, a user may sent a request to create a data set, create a data set instance, delete a data set, or delete a data set instance. In embodiments, a data set may include metadata that indicates a collection of data (e.g., indicating a particular type of data), whereas a data set instance may be an instance of the data set that contains data of the particular type (e.g., collected event data) and the data set instance may be assigned a unique identifier. In some embodiments, a data set can only be deleted if there are no instances of the data set (e.g., the data sets have all been deleted). In some embodiments, a data set instance can only be deleted if there are no children data set instances of the data set instance (or if all existing children are deleted).

In some embodiments, a machine learning (ML) life cycle may require continuous generation of data set instances for one or more purposes, such as benchmarking and model training (e.g., natural language models or any other type of ML model). Users may configure a data set management service (e.g., via an API request) to run a certain transformation at a certain frequency/schedule (e.g., on data collected over time and stored at a bucket). A user can then use the results of the transformation to automate their machine learning workflows (e.g., to train models with updated data over time, on a periodic basis). In embodiments, a user can request a data set management service to run a certain transformation pattern (described below) at a certain frequency. The user may then use the end result for machine learning workflows (e.g., as training data to train ML models).

In various embodiments, a user may label and/or discover data set instances. For example, data set instance veg-indian-restaurant-data-set/1 can be assigned the labels "veg," "indian," and "restaurant." A user may provide a query (e.g., API request) to a data set management service to list all of the data set instances (or data sets) that have these labels assigned to them.

Embodiments may provide a way to apply a transformation pattern in order to perform data set lineage replication. For example, the restaurant-event-set/1 Data Set Instance may be obtained by performing the transformation (a) get-restaurant-event-set/1 on source bucket A, the indian-restaurant-data-set/1 Data Set Instance may be obtained by performing the transformation (b) get-indian-restaurant-data-set/1 on the restaurant-event-set/1 Data Set Instance, and veg-indian-restaurant-data-set/1 Data Set Instance may be obtained by performing transformation (c) get-veg-indian-restaurant-data-set/1 on the indian-restaurant-dataset/1 Data Set Instance. The transformation pattern for the above series of transformations is to perform transformation (a) on the source, then transformation (b) on resulting data set instance, and finally transformation (c) on the next resulting data set instance. This transformation pattern may be defined, assigned a label, and stored with the associated label get-veg-indian-restaurant-workflow (e.g., via one or more API requests from a user). A user may select two or more transformations to define a transformation pattern. For example, the user may indicate a particular one of the transformations is to be run on a selected data source (e.g., bucket or data set instance) to generate a first data set instance, indicate that another one of the transformations is to be run on the first data set instance to generate a second data set instance, etc. (to any number of levels).

In embodiments, a user may define the transformation pattern "get-veg-indian-restaurant-workflow" and provide a new source (e.g., source bucket B) and request the data set management service to perform the get-veg-indian-restaurant-workflow transformation on the new source (e.g., via an API request that specifies source bucket B and get-veg-indian-restaurant-workflow). This workflow will create intermediate data set instances based on the new source (similar to the resulting data set instances for the above process used for source bucket A) and finally provide the end resulting data set instance after performing the (a), (b) and (c) transformations (e.g., generating three generations of data set instances). In embodiments, a transformation pattern may be scheduled (e.g., every 24 hours) to run on any number of data sources (e.g., via an API request that indicates the data source (e.g., data bucket or other storage location), the transformation pattern (e.g., label), and/or the schedule/frequency).

Various embodiments may provide the ability to create, store, read, version, and/or delete transformations that can be applied to data (e.g., to a source bucket or to a data set instance). For example, a user can create a transformation called get-restaurant-event-set/1 (where "1" refers to the version). The transformation may be a SQL query, Python query, or any other query/script that use any other format. Running the transformation on a source bucket may result in obtaining, from the source bucket, the first 100 events that occurred at a restaurant on Jun. 15, 2021. Any number of other versions based on the initial version may be created/stored and available for use to create data set instances (e.g., by changing any number of parameters used for the initial version of the transformation/query). For example, a user can create a second version of the transformation called get-restaurant-event-set/2. Running the transformation on a source bucket (e.g., the same or different source bucket) may result in obtaining, from the source bucket, the first 1000 events that occurred at a restaurant on Jun. 15, 2021 (instead of running the transformation on only the first 100 events). A third version of the transformation might be based on the second version, but the data may be changed to Jun. 16, 2021.

In embodiments, a user may have the ability (e.g., via API requests) to 1) create a transformation, 2) read the transformation, 3) create/save a new version of the transformation (e.g., if the user wants to retain the same name (get-restaurant-event-set) for a transformation to obtain the first 2000 events (instead of 100) relating to restaurant on Jun. 15, 2021, they may choose to create a new version), 4) provide nicknames (aliases) to the transformation version (e.g., get-restaurant-event-set/1 can be nicknamed or aliased as get-restaurant-event-set-first-100-events-06-05-2021), and/or 5) delete the transformation. In embodiments, deletion will only be allowed if the transformation is not referenced by any data set instance.

In various embodiments, a response message is returned to the client to indicate and/or confirm actions that the data set management service takes in response to receiving the request and/or to indicate/confirm the request was received. For example, in response to receiving a request from a client to delete a data set instance A, the data set management service may delete data set instance A and send a response to the client that indicates/confirms that data set instance A was deleted or will be deleted.

In embodiments, one or more different types of formats may be used to transmit or store data and/or metadata. For example, data set lineage metadata and/or transformations/queries may be stored in JavaScript object notation (JSON), yet another markup language (YAML), extensible markup language (XML), etc.

FIG. 3 illustrates examples of actions performed by a user for data set management, according to some embodiments.

The requests described in FIG. 3 are examples of requests that a user may provide to a data set management service to perform actions as described herein. However, any of the requests/actions described herein (e.g., for any of FIGS. 1-10) may also be performed for a user in the same/similar manner as described for the following example requests/actions.

As shown, a user 302 of a client may submit a request to a data set management service 304 to create data set instance A (createDataSetInstanceARequest). The request may specify the transformation to be used as well as the parent data set instance (or other data source, such as a bucket) that the transformation is to be run on. In some embodiments, the request may include the transformation itself (e.g., query script). In some embodiments, the request may include a name/identifier of the transformation to be used (e.g., a transformation that was previously created and stored by the user or another user). Similarly, in some embodiments, requests described herein may specify a data set instance by including a name/identifier of the data set instance.

If the request includes the transformation itself, then the data set management service may perform validation on the transformation. For example, if the transformation does not contain errors, then the service will accept the request; otherwise, the service may return a message indicating that the request was denied due to errors in the transformation. Upon acceptance of the request and/or creation of the data set instance, the service may return a response to indicate the request was accepted and/or the data set instance was created/stored by the service.

In the depicted embodiment, the user also sends a request to label data set instance A (labelDataSetInstanceARequest). The request may specify the data set instance to be labeled, as well as the labels "veg," "indian," and "restaurant." Upon acceptance of the request and/or creation of the labels, the service may return a response to indicate the request was accepted and/or the labels were created/stored by the service.

As shown, the user also sends a request to create a new transformation (e.g., transformation X). The request may specify the transformation to be created (e.g., query script). In embodiments, if the transformation does not contain errors, then the service will accept the request; otherwise, the service may return a message indicating that the request was denied due to errors in the query script. Upon acceptance of the request and/or creation of the transformation, the service may return a response to indicate the request was accepted and/or the transformation was created/stored by the service.

The user also sends a request to schedule transformation X (e.g., run transformation X according to a specified schedule). The request may specify transformation X, the data source (e.g., data set instance A or other data source/bucket), and the schedule (e.g., every 24 hours). Upon acceptance of the request and/or creation of the schedule, the service may return a response to indicate the request was accepted and/or the schedule was created/stored and/or initiated by the service. In embodiments, transformation patterns may be scheduled in the same/similar way.

As depicted, the user also sends a request to apply a transformation pattern (TransformationPatternY) to a data source. The request may specify the transformation pattern and the data source to run the pattern on (e.g., data set instance A). Upon acceptance of the request and/or execution of the transformation pattern, the service may return a response to indicate the request was accepted and/or the transformation pattern was initiated/executed by the service to generate the resulting data set instance(s).

FIG. 4 is a logical block diagram illustrating a system for data set management using data set lineage metadata, according to some embodiments.

As shown, a service provider network 402 may include a data set management service 404 that may be used by users 106 of any number of internal clients (e.g., different groups/organizations of a service provider that owns the provider network 402) and/or users 408 of any number of external clients 410 (e.g., users 408 access the provider network 402 from a remote network). The provider network may include any number of other services 410 that may be used by the data management service and/or clients (e.g., compute services, storage services). For example, the data management service may use storage devices of a storage service to store data set instances.

The users 408 may access the provider network 402, including the data management service and other services, by communicating with the provider network 402 via a wide area network 412 (e.g., the internet). Any number of the users access the provider network via stand-alone devices (e.g., a smart phone or other mobile device) or a PC that is part of a local client network (e.g., a private network of a company).

In the example embodiment, a user (e.g., user 406a) may send a request (e.g., using an application programming interface (API)) to an API gateway 114 of the data set management service 404 to generate a data set instance. The API gateway 414 of a data set manager 416 may authenticate and/or authorize the user based on credentials provided by the request before generating the data set instance (e.g., by using an identity and access management service 434 of the provider network). For example, the identity and access management service 434 may obtain the user-provided credentials (e.g., sent by the API gateway 414) and authenticate and/or authorize the request based on security credential information for the user and/or permissions for the user that are stored/maintained by the identity and access management service 434. In various embodiments, some or all of the functionality of the identity and access management service 434 may be performed by the data set management service 404 itself (authentication, authorization, maintaining credentials/permissions, etc.). As described herein, in various embodiments any other types of user requests may be authenticated and/or authorized in the same/similar manner (e.g., requests to modify/delete a data set instance, requests to create/delete a transformation, etc.). For example, a user may be authorized to perform only certain types of requests (e.g., the user may create new data sets, but may not be allowed to create new transformations).

In some embodiments, in response to authorizing the request to generate a data set instance, the function may generate and store data set lineage metadata 420 for the data set instance and send the request to a transformation engine 422 assigned to a client account 424 of the client. As shown, the service may provide separate transformation engine(s) and data storage resources for any number of different client accounts, allowing for multi-tenancy.

In some embodiments, the function may select, based on one or more criteria, a query engine (or other type of transformation engine) from among a plurality of available query engines (or transformation engines) to perform the transformation. For example, the function may select a particular query engine because it is capable of performing the requested transformation and others are not. The transformation engine may then perform the transformation on the target data or the target data set instance in order to generate a new data sent instance 410n.

Depending on the transformation and/or other criteria, a different query engine may be selected to perform another transformation at a later time for the same data/data set or for a different data/data set. For example, to generate a new child data set or to update a child data set at a later time, a different transformation engine may be selected (e.g., because the different transformation engine is capable of performing the requested transformation and others are not).

As shown, an ingestion manager 428 may receive events from a client. The events 430 may be stored in a data store (e.g., a bucket) that is assigned to the client. When one or more new events 430 (or other data) are stored to the client's data store, the service may generate an updated version of any number of data set instances and child data set instances based on the new events (or other data) according to the data set lineage metadata. In some embodiments, one or more events may be modified or deleted from the client's data store (e.g., deleted from the bucket). In those cases, the service may generate an updated version of any number of data set instances and child data set instances based on the modifications or deletions according to the data set lineage metadata.

As described herein, in various embodiments, the service may allow a user to modify a particular data set instance (e.g., delete events, add events, modify events my adding data). In response, the service may generate an updated version of any number of child data set instances based on the modification according to the data set lineage metadata.

In some embodiments, users may send a request to a data application 432 (or other component) of the service to perform an action to a data set instance(s). For example, the user may request to view a data set instance or to view the data set lineage metadata (e.g., a DAG). In response, the data application may obtain read-only access to data store(s) and then provide the requested data to the user (e.g., via a user display).

Embodiments may provide fine-grained access control for data sets based on data set lineage metadata (e.g., using the identity and access management service 434 and/or the data set management service 404). In some embodiments, by default, if a user has permissions for a parent data set instance (e.g., permission to read/modify the parent data set instance), then the user will have the same permissions for all of the child data set instances that are based on the parent data set (e.g., down to any number of generations of children). By default, if a user is assigned permissions for a child data set instance, then the user will not have permissions for the parent and/or sibling data set instances. In embodiments, a user or administrator may override these defaults in order to give or remove permissions for a particular user (e.g., for any number of particular data set instances, for all parent data set instances, for all sibling data set instances, etc.).

Embodiments may provide user-based access control for any type of data/components (e.g., data set instances, source data, transformations) and/or metadata described herein. For example, a user may be assigned permissions to create, read, and/or modify a transformation, a transformation schedule, a transformation pattern, a transformation pattern schedule, etc. Based on the assigned permissions for a particular transformation, a user may or may not be allowed to re-name the transformation, change the transformation, create another version of the transformation, etc.

Figure 5:
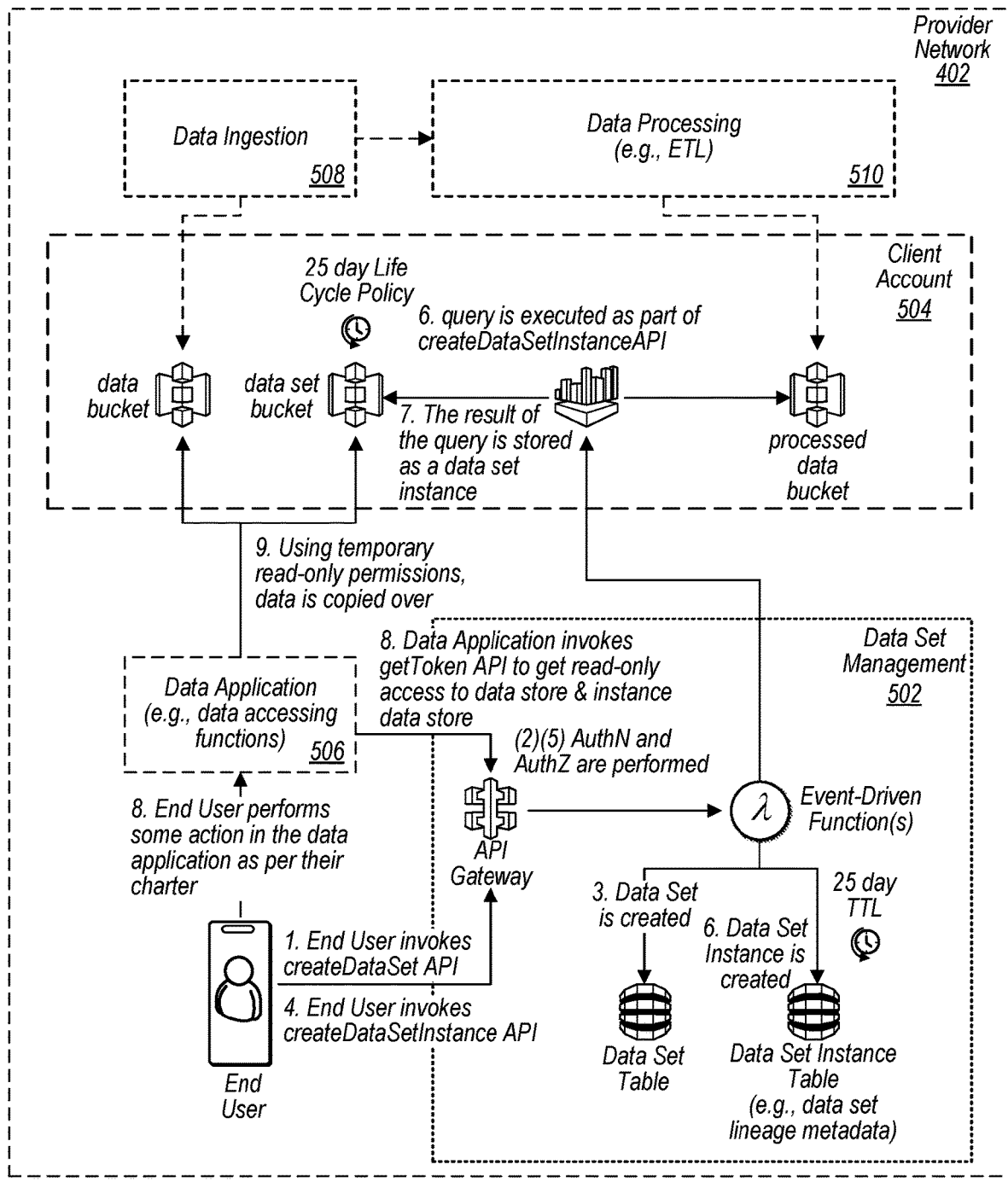
FIG. 5 is a logical block diagram illustrating a system for data set management using data set lineage metadata, according to some embodiments.

FIG. 5 is a logical block diagram illustrating a system for data set management using data set lineage metadata, according to some embodiments.

Similar to FIG. 4, a provider network 402 may perform various functions in order to manage data sets on behalf of a user/client. As shown in step 1, a user may invoke an API to create a data set. At step 2, the request may be authenticated and/or authorized by the API gateway of the data set management 502 component based on credentials provided by the user. At step 3, the data set is created. This may include generating metadata for the data set and storing an entry for the new data set into a table.

At step 4, the user invokes an API to create a data set instance. At step 5, the request may be authenticated and/or authorized based on credentials provided by the user. At step 6, a query is executed as part of the API (e.g., by an event-driven function). As shown, the function may also generate and store data set lineage metadata for the data set instance into a data set instance table. The query may be executed on a processed data bucket assigned to the client account 504 (e.g., data obtained from the client, processed, and stored in the processed data bucket). At step 7, the result of the query is stored as a data set instance into a data set bucket assigned to the client account 404.

At step 8, the user performs an action in a data application/component 506 (e.g., accessing a data set instance and/or data set lineage metadata). The data application invokes an API to get temporary read-only permission to the data store(s) (e.g., data bucket and/or data set bucket). At step 9, the data application uses the temporary read-only permission to copy over the requested data (e.g., data set instance and/or data set lineage metadata). In embodiments, non-queryable data that was ingested 508 (e.g., audio files that cannot be processed through ETL 510) may be obtained from the data bucket and accessed by the user. In the depicted embodiment, a data set instance may have a 25 day time to live, based on a 25 day life cycle policy (e.g., the data set instance is not automatically deleted 25 days after it is generated). In some embodiments, any other length of time may be used, or none at all (e.g., the data set instance is not automatically deleted).

Figure 6:
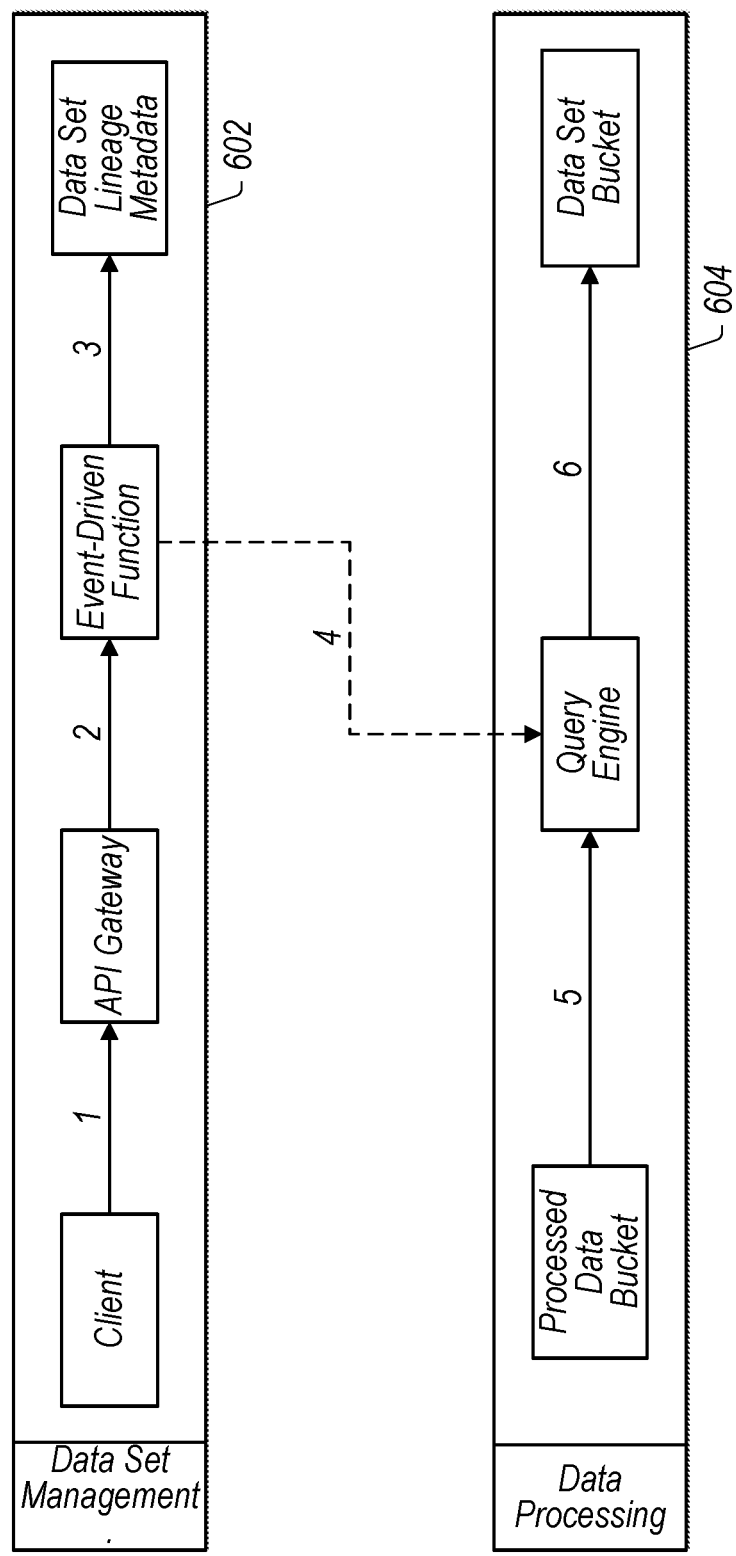
FIG. 6 illustrates an example of generating a data set instance and data set lineage metadata for the data set instance, according to some embodiments.

FIG. 6 illustrates an example of generating a data set instance and data set lineage metadata for the data set instance, according to some embodiments.

As shown, client (e.g., user) sends a request to generate a data set instance to an API gateway of a data set management 602 component. The data set management 602 generates data set lineage metadata for the data set instance and stores it. An event-driven function causes execution of a transformation (e.g., by a query engine) on the processed data bucket to generate the data set instance, and the data set instance is stored in the data set bucket to complete the data processing stage 604. As shown, the data set management 602 component may handle the generation of data set lineage metadata, while allowing other data processing components of the service/provider network to handle the generation and storage of data set instances. In some embodiments, the components/functions of the data set management 602 and the data processing 604 stages may be provided by one service or by one or more different services (e.g., data set management service and data storage service).

Figure 7A:
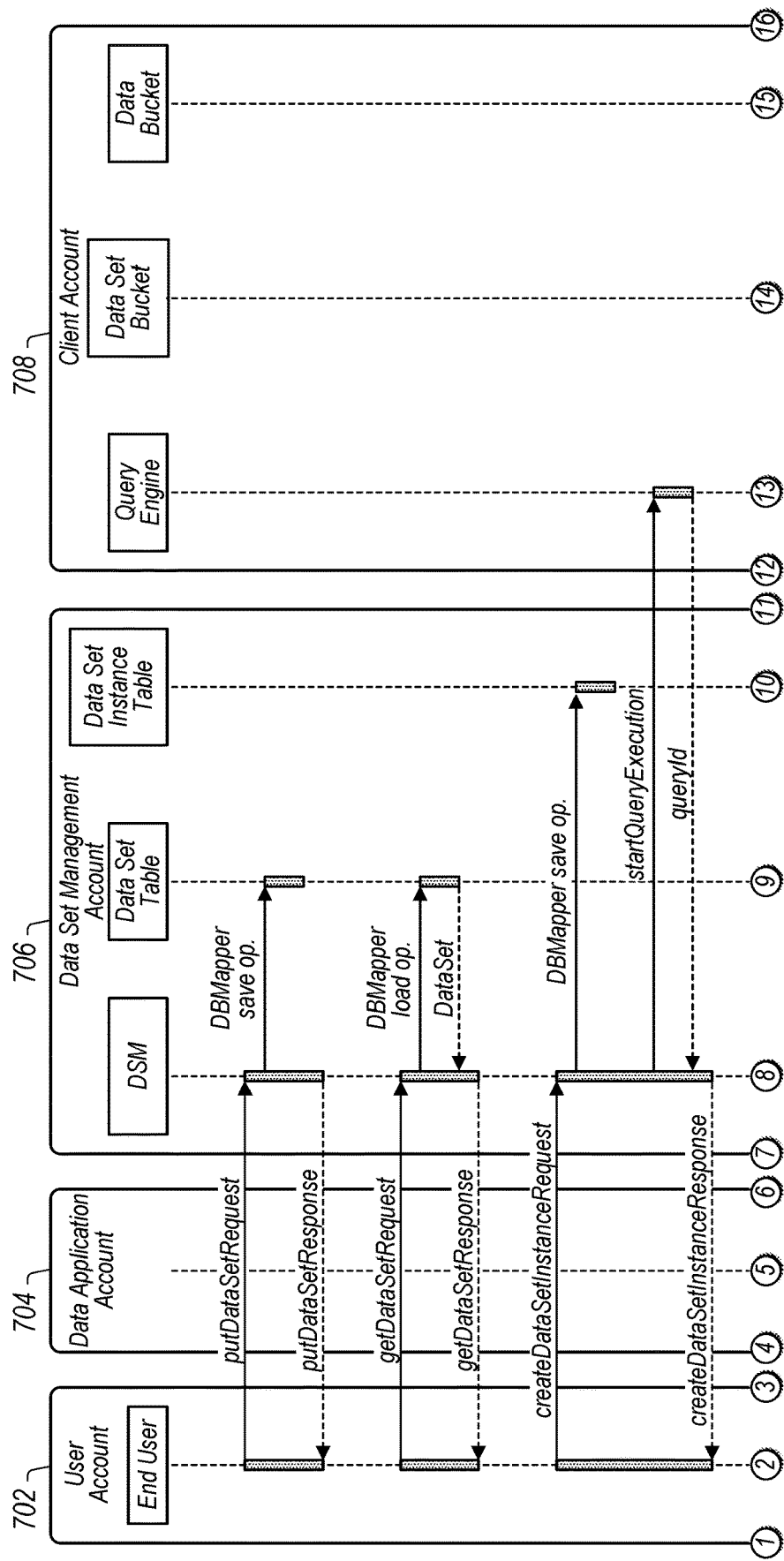
FIGS. 7A and 7B illustrate examples of actions performed by a user for data set management, according to some embodiments.
Figure 7B:
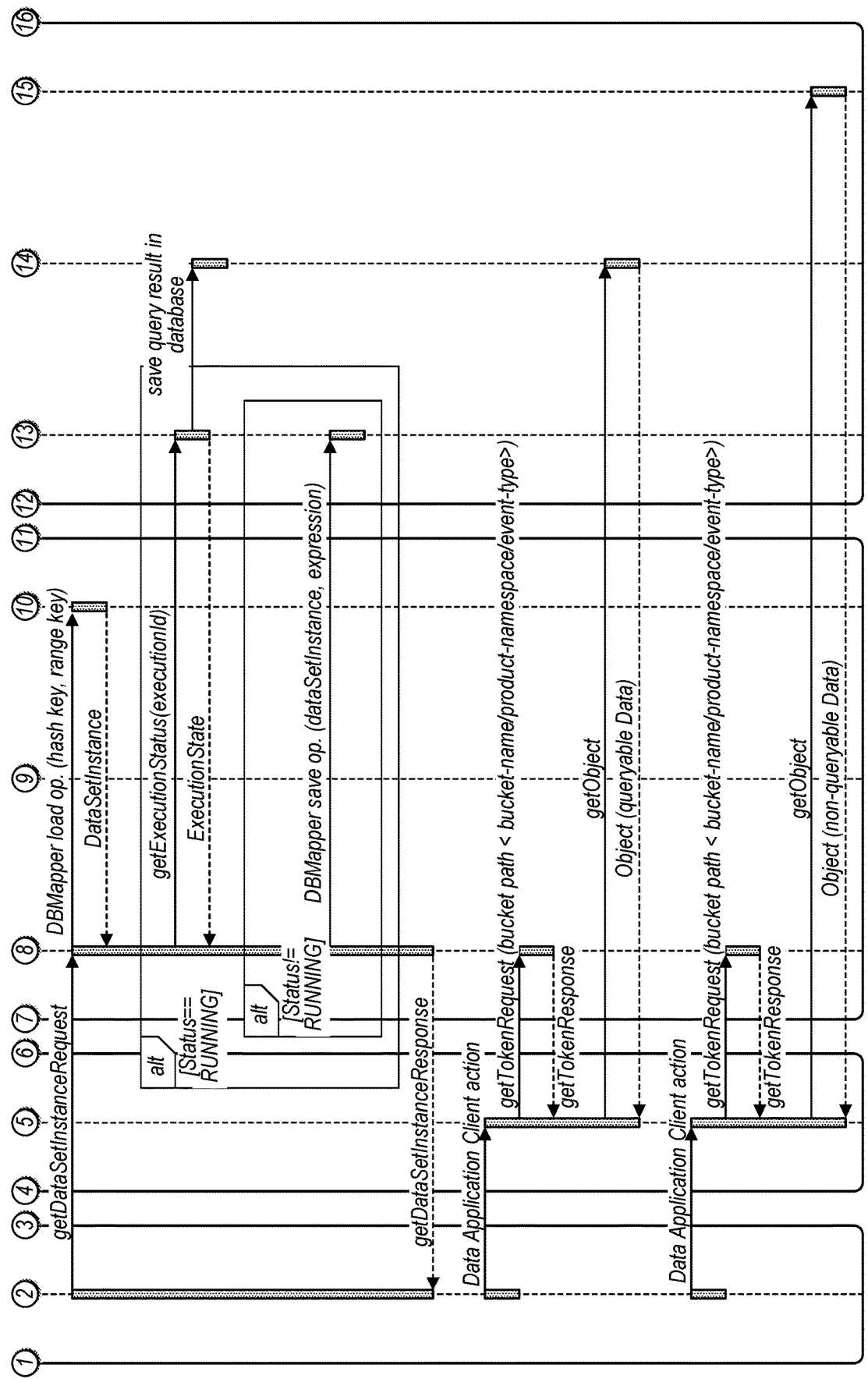

FIGS. 7A and 7B illustrate examples of actions performed by a user for data set management, according to some embodiments.

The example embodiment, the user account 602 is an account of the data set management service that is assigned to the user, the data application account 604 is an account of the data application that is assigned to the user, the data set management account is an account of the data set management service that is assigned to the client, and the client account is an account of the provider network that is assigned to the client. As shown, the data set management account owns the data set management (DSM) service, the data set table, and the data set instance table. The client account owns the query engine, the data set bucket (e.g., for storing generated data sets), and the data bucket (e.g., for storing source data/events obtained from the client).

As shown in FIG. 7A, the end user may send a putDataSetRequest to the DSM. The DSM may save metadata to the data set table and return a putDataSetResponse to confirm the creation of the data set table. The user may also send a getDataSetRequest to the DSM. The DSM may retrieve metadata from the data set table and return a putDataSetResponse to confirm the creation of the data set table.

The user may also send a createDataSetInstanceRequest to the DSM. The DSM may save data set lineage metadata to the data set instance table, start the query execution at the query engine, obtain the queryID, and return a putDataSetResponse to confirm the start of the query.

FIG. 7B shows examples of some other API calls that may be made. For example, the user may send a getDataSetInstanceRequest to the DSM. The DSM may retrieve metadata from the query engine return a putDataSetResponse to confirm the creation of the data set instance.

The user may also request an action to be performed by the client application (e.g., view a data set instance). The client application may use a getTokenRequest to obtain a security token that provides temporary read-only permission to copy over a data set instance (or a portion of the data set instance) from the data set bucket and return the data to the data application for viewing by the user. The user may request another action to be performed by the client application (e.g., listen to an audio file or obtain/access other non-qeuryable data). For example, the client application may use a getTokenRequest to obtain temporary read-only permission to copy over an audio file from the data bucket and return the audio file to the data application for listening by the user.

Figure 8:
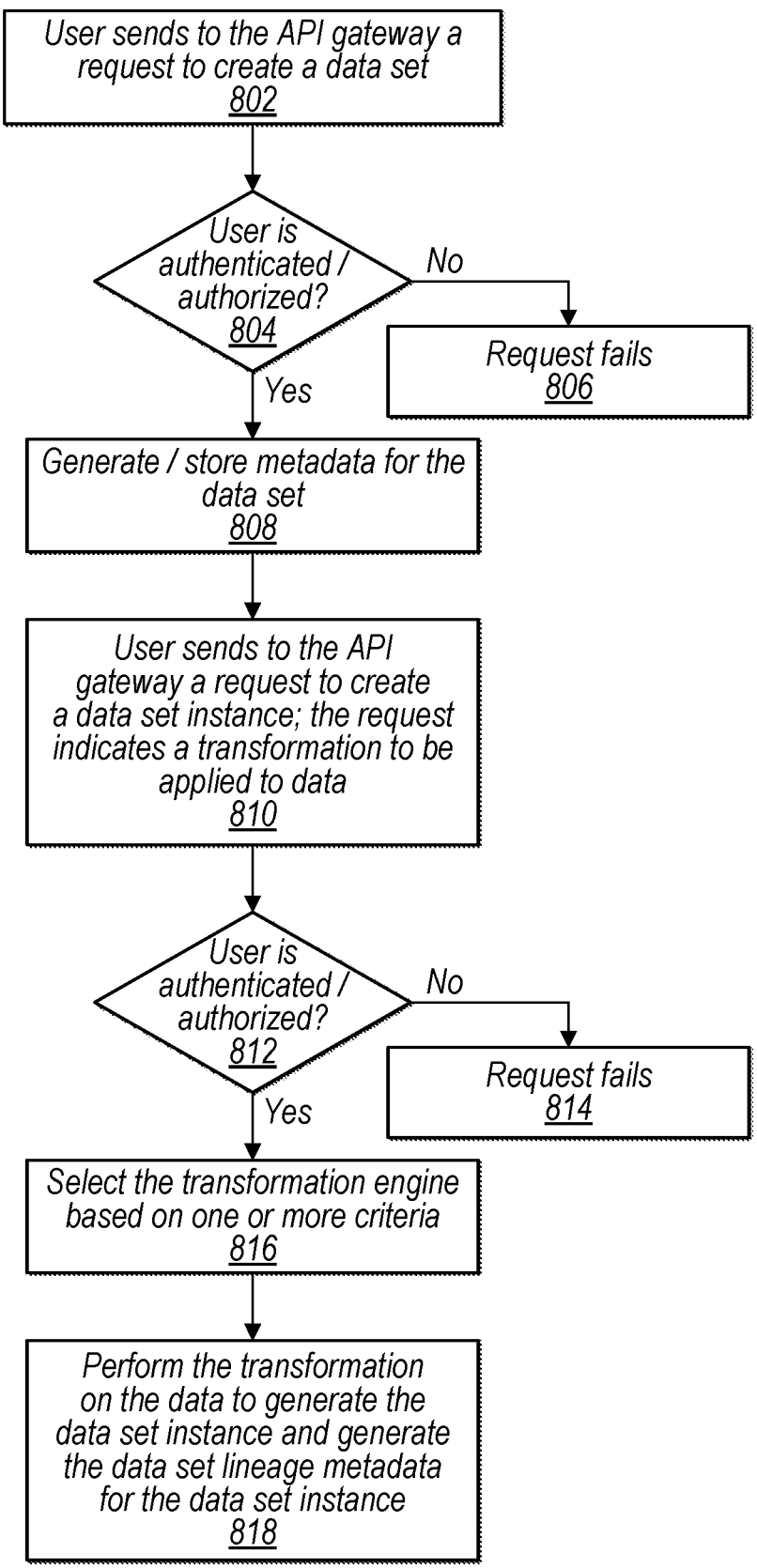
FIG. 8 is a high-level flowchart illustrating various methods and techniques to generate a data set instance and data set lineage metadata for the data set instance, according to some embodiments.

FIG. 8 is a high-level flowchart illustrating various methods and techniques to generate a data set instance and data set lineage metadata for the data set instance, according to some embodiments. In various embodiments, any of the functionality described for any portions of the flowcharts 8-10 may be performed by any of the components of FIGS. 1-7 and/or 11.

Figure 9:
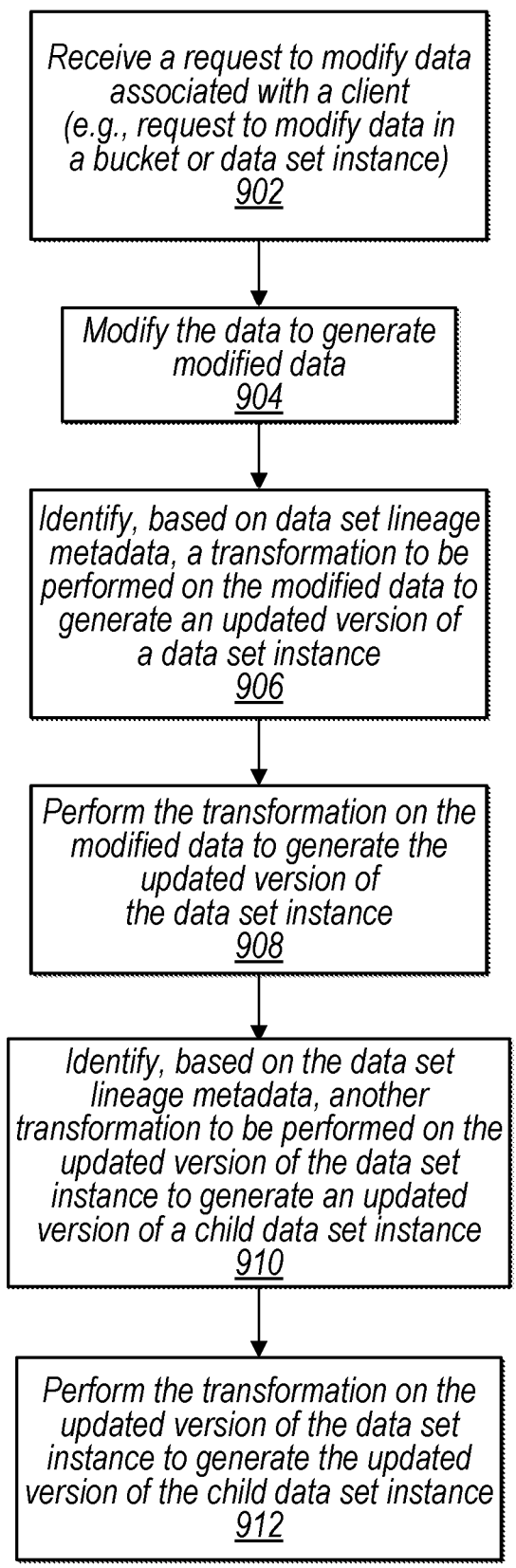
FIG. 9 is a high-level flowchart illustrating various methods and techniques to implement data set management using data set lineage metadata, according to some embodiments.
Figure 10:
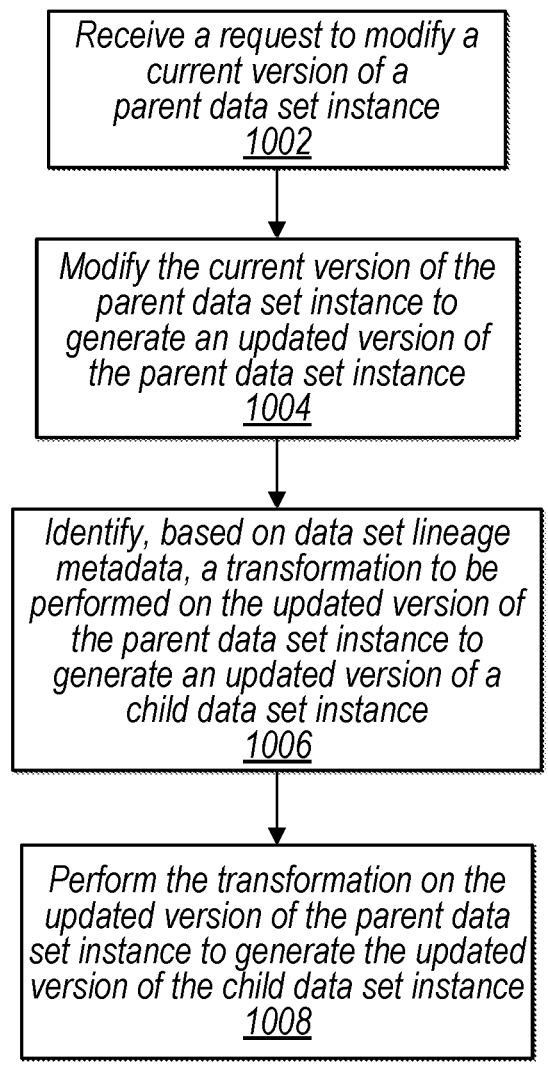
FIG. 10 is a high-level flowchart illustrating various methods and techniques to implement data set management using data set lineage metadata, according to some embodiments.

These techniques, as well as the techniques discussed with regard to FIGS. 9 and 10, may be implemented using components or systems as described above with regard to FIGS. 1-7, as well as other types of components or systems, and thus the following discussion is not intended to be limiting as to the other types of systems that may implement the described techniques. For example, the techniques may be implemented by a simulation environment of a provider network and/or a client device.

At block 802, a user sends, to an API gateway of a data set management service, a request to generate a data set. At block 804, the service determines if the user is authenticated and/or authorized to create the data set. If not, then the request fails at block 806. If so, then at block 808, the service generates and stores metadata for the data set (e.g., at a data set table).

At block 810, the user sends, to the API gateway, a request to create a data set instance. The request indicates a transformation to be applied to data (e.g., to data at a data bucket or to a data set instance). At block 812, the service determines if the user is authenticated and/or authorized to create the data set instance. If not, then the request fails at block 814. If so, then at block 816, selects a transformation engine based on one or more criteria. If only one engine is available, then block 816 is not performed. At block 818, the query engine performs the transformation on the data to generate the data set instance and generates and the service generates the data set lineage metadata for the data set instance and stores it (e.g., at a data set instance table).

FIG. 9 is a high-level flowchart illustrating various methods and techniques to implement data set management using data set lineage metadata, according to some embodiments.

At block 902, a data set management service receives a request to modify data associated with a client. At block 904, the service modifies the data to generate modified data (e.g., adding new events, updating events, deleting events). At block 906, the service identifies, based on data set lineage metadata, a transformation to be performed on the modified data to generate an updated version of a data set instance. At block 908, the service performs the transformation on the modified data to generate the updated version of the data set instance.

At block 910, the service identifies, based on the data set lineage metadata, another transformation to be performed on the updated version of the data set instance to generate an updated version of a child data set instance. At block 912, the service performs the transformation on the updated version of the data set instance to generate the updated version of the child data set instance.

FIG. 10 is a high-level flowchart illustrating various methods and techniques to implement data set management using data set lineage metadata, according to some embodiments.

At block 1002, the data set management service receives a request to modify a current version of a parent data set instance. At block 1004, the service modifies the current version of the parent data set instance to generate an updated version of the parent data set instance. At block 1006, the service identifies, based on the data set lineage metadata, a transformation to be performed on the updated version of the parent data set instance to generate an updated version of a child data set instance. At block 1008, the service performs the transformation on the updated version of the parent data set instance to generate the updated version of the child data set instance.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of the data set management service and any other components that implement the techniques described herein). The various methods as illustrated in the figures and described herein represent example embodiments of methods. The order of any method may be changed, and various elements may be added, reordered, combined, omitted, modified, etc.

Figure 11:
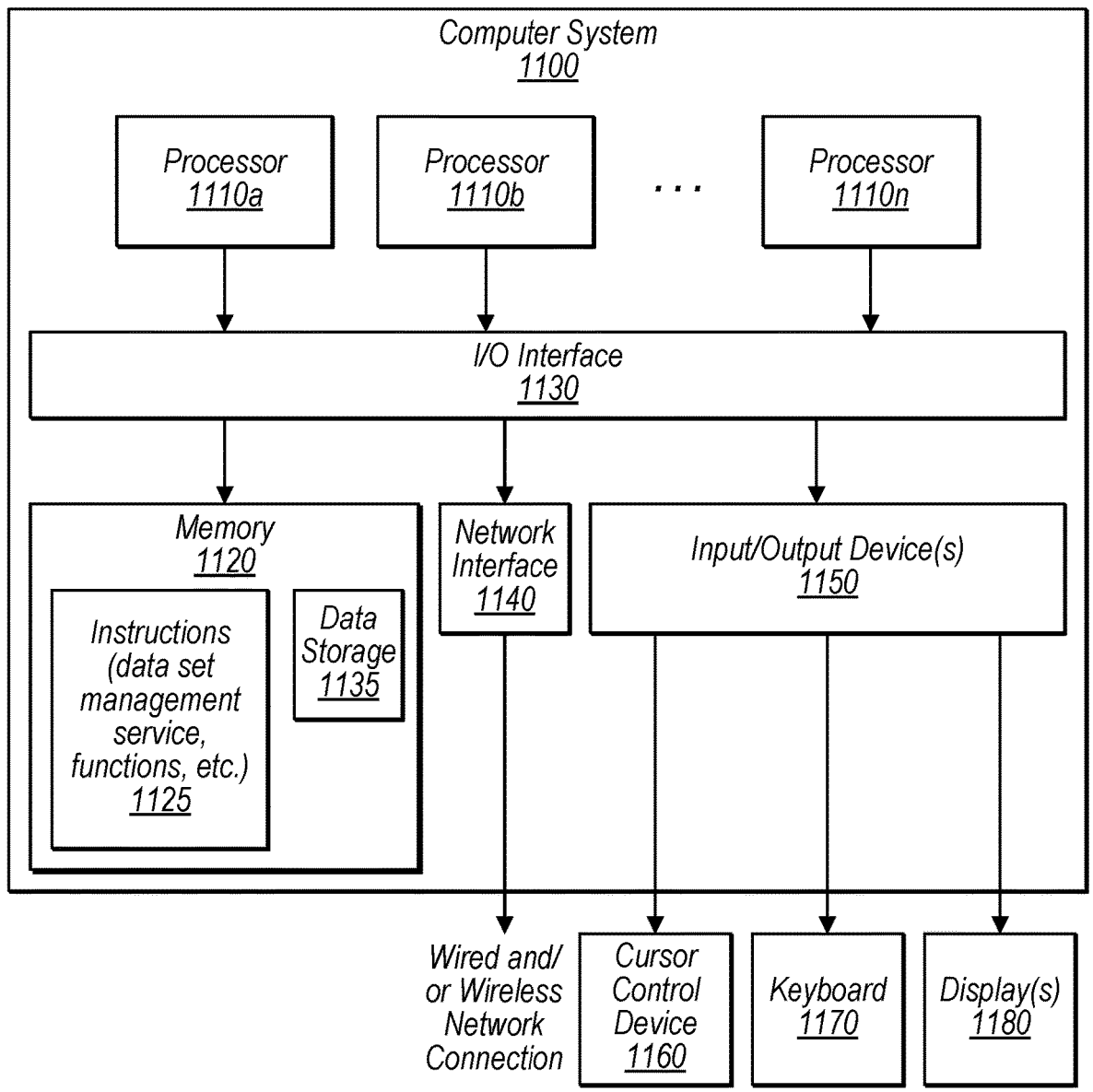
FIG. 11 is a block diagram illustrating an example computing system, according to some embodiments.

Embodiments to implement data set management using data set lineage metadata, which may interact with various other systems or devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) may include standard computer monitor(s) and/or other display systems, technologies or devices, in one embodiment. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions, in one embodiment. For example, in various embodiments, processors 1110 may be general-purpose or embedded processors implementing any of a variety of instruction set architectures (ISAs), such as the x86, PowerPC, SPARC, or MIPS ISAs, ARM, or any other suitable ISA. In multiprocessor systems, each of processors 1110 may commonly, but not necessarily, implement the same ISA.

In some embodiments, at least one processor 1110 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1120 may store program instructions 1125 and/or data accessible by processor 1110, in one embodiment. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., data set management service and any other components, etc.) are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. A computer-accessible medium may include non-transitory storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140, in one embodiment.

In one embodiment, I/O interface 1130 may be coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1110.

Network interface 1140 may allow data to be exchanged between computer system 1100 and other devices attached to a network, such as other computer systems, or between nodes of computer system 1100, in one embodiment. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100, in one embodiment. Multiple input/output devices 1150 may be present in computer system 1100 or may be distributed on various nodes of computer system 1100, in one embodiment. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1125 that implement the various embodiments of the systems as described herein, and data store 1135, comprising various data accessible by program instructions 1125, in one embodiment. In one embodiment, program instructions 1125 may include software elements of embodiments as described herein and as illustrated in the Figures. Data storage 1135 may include data that may be used in embodiments (e.g., events, data set instances, data set lineage metadata, functions, etc.). In other embodiments, other or different software elements and data may be included.

Those skilled in the art will appreciate that computer system 1100 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1100 may be transmitted to computer system 1100 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium.

Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors; and
one or more memories, wherein the one or more memories have stored thereon instructions, which when executed by the one or more processors of a provider network, cause the one or more processors to:
 obtain data associated with a client, wherein the data comprises a plurality of events;
 receive, from a user associated with the client, a request to generate a data set instance, wherein the request indicates a transformation to be performed on the obtained data;
 in response to the request:
  perform the transformation on the obtained data to generate a current version of the data set instance; and
  generate data set lineage metadata, wherein the data set lineage metadata indicates that the current version of the data set instance is derived from the obtained data based on the transformation;
 receive, from the user, another request to generate a child data set instance, wherein the other request to generate the child data set instance indicates another transformation to be performed on the current version of the data set instance;
 in response to the other request to generate the child data set instance:
  perform the other transformation on the current version of the data set instance to generate a current version of the child data set instance; and
  add, to the data set lineage metadata, an indication that the current version of the child data set instance is derived from the current version of the data set instance based on the other transformation;
 obtain additional data from the client, wherein the additional data comprises one or more additional events;
 update the obtained data based on the additional data to generate updated data;
 based on the generation of the updated data, generate an updated version of the data set instance by performance of the transformation on the updated data to propagate the update to the data set instance according to the transformation indicated by the data set lineage metadata;
 based on the generation of the updated version of the data set instance by performance of the transformation on the updated data, generate an updated version of the child data set instance by performance of the other transformation on the updated version of the data set instance to propagate the update to the child data set instance according to the other transformation indicated by the data set lineage metadata,
 wherein the transformation performed on the updated data to generate the updated version of the data set instance is a different transformation than the other transformation subsequently performed on the updated version of the data set instance to generate the updated version of the child data set instance,
 wherein the current version of the data set instance and the current version of the child data set instance are inaccessible to the user subsequent to the generation of the updated version of the data set instance and the updated version of the child data set instance; and
 provide, to an application, at least a portion of the updated version of the child data set instance for viewing by a user.

2. The system as recited in claim 1, wherein to generate an updated version of the data set instance and an updated version of the child data set instance according to the data set lineage metadata, the instructions, when executed by the one or more processors, cause the one or more processors to:
 identify, based on the data set lineage metadata, the transformation to be performed on the updated data to generate the updated version of the data set instance;
 in response to the identification of the transformation, perform the transformation on the updated data to generate the updated version of the data set instance;
 identify, based on the data set lineage metadata, the other transformation to be performed on the updated version of the data set instance to generate the updated version of the child data set instance; and
 in response to the identification of the other transformation, perform the other transformation on the updated version of the data set instance to generate the updated version of the child data set instance.

3. The system as recited in claim 1, wherein the instructions, when executed by the one or more processors, further cause the one or more processors to:
 receive, from the user, an additional request to generate an additional child data set instance, wherein the additional request indicates an additional transformation to be performed on the current version of the child data set instance to generate a current version of the additional child data set instance;
 in response to the additional request:
  perform the additional transformation on the current version of the child data set instance to generate the current version of the additional child data set instance; and
  add, to the data set lineage metadata, an indication that the current version of the additional child data set instance is derived from the current version of the child data set instance based on the additional transformation;

identify, based on the data set lineage metadata, the additional transformation to be performed on the updated version of the child data set instance to generate an updated version of the additional child data set instance; and in response to the identification of the additional transformation, perform the additional transformation on the updated version of the child data set instance to generate the updated version of the additional child data set instance.

4. The system as recited in claim 1, wherein the instructions, when executed by the one or more processors, further cause the one or more processors to:

receive, from the user, an additional request to generate an additional child data set instance, wherein the additional request indicates an additional transformation to be performed on the current version of the data set instance to generate a current version of the additional child data set instance;

in response to the additional request:
perform the additional transformation on the current version of the data set instance to generate the current version of the additional child data set instance; and add, to the data set lineage metadata, an indication that the current version of the additional child data set instance is derived from the current version of the data set instance based on the additional transformation;

identify, based on the data set lineage metadata, the additional transformation to be performed on the updated version of the data set instance to generate an updated version of the additional child data set instance; and in response to the identification of the additional transformation, perform the additional transformation on the updated version of the data set instance to generate the updated version of the additional child data set instance.

5. The system as recited in claim 1, wherein the instructions, when executed by the one or more processors, further cause the one or more processors to:

receive, from the user, a request to generate an additional data set instance, wherein the request to generate an additional data set instance indicates an additional transformation to be performed on the obtained data;

in response to the request to generate an additional data set instance:
perform the additional transformation on the obtained data to generate a current version of the additional data set instance; and add, to the data set lineage metadata, an indication that the current version of the additional data set instance is derived from the obtained data based on the additional transformation;

receive, from the user, a request to generate a new data set instance, wherein the request to generate a new data set instance indicates a new transformation to be performed on the current version of the additional data set instance and the current version of the child data set instance;

in response to the request to generate a new data set instance:
perform the new transformation on the current version of the additional data set instance and the current version of the child data set instance to generate a current version of the new data set instance; and add, to the data set lineage metadata, an indication that the current version of the new data set instance is derived from the current version of the additional data set instance and the current version of the child data set instance; and generate an updated version of the additional data set instance and an updated version of the new data set instance based on the updated data according to the data set lineage metadata.

6. A method, comprising:
performing, by one or more computing devices:
receiving a request to modify data associated with a client,
wherein data set lineage metadata indicates that a current version of a parent data set instance is derived from the data based on a transformation and a current version of a child data set instance is derived from the current version of the parent data set instance based on another transformation;

in response to receiving the request, modifying the data to generate modified data;

identifying, based on the data set lineage metadata, the transformation to be performed on the modified data to generate an updated version of the parent data set instance;

in response to identifying the transformation, performing the transformation on the modified data to generate the updated version of the parent data set instance to propagate the modifying of the data to the parent data set instance according to the transformation indicated by the data set lineage metadata;

identifying, based on the data set lineage metadata, the other transformation to be performed on the updated version of the parent data set instance to generate an updated version of the child data set instance;

in response to identifying the other transformation and subsequent to the generation of the updated version of the parent data set instance by performance of the transformation on the modified data, performing the other transformation on the updated version of the parent data set instance to generate the updated version of the child data set instance to propagate the modifying of the data to the child data set instance according to the other transformation indicated by the data set lineage metadata, wherein the transformation performed on the modified data to generate the updated version of the parent data set instance is a different transformation than the other transformation subsequently performed on the updated version of the parent data set instance to generate the updated version of the child data set instance, and providing, to an application, at least a portion of the updated version of the child data set instance for viewing by a user.

7. The method as recited in claim 6, wherein the data associated with the client comprises a plurality of events, and wherein modifying the data to generate modified data comprises one or more of:
adding one or more new events to the data, or
appending data to one or more of the plurality of events.

8. The method as recited in claim 6, further comprising:
assigning one or more labels to updated version of the parent data set instance or the updated version of the child data set instance.

9. The method as recited in claim 6, wherein the data associated with the client comprises a plurality of events, and wherein modifying the data to generate modified data comprises:
determining that the user is authorized to modify the data; and
in response to determining the user is authorized to modify the data, deleting one or more of the plurality of events indicated by the request.

10. The method as recited in claim 9, wherein individual events of the plurality of events comprise an event identifier that uniquely identifies the event with respect to other events of the plurality of events, and wherein deleting one or more of the plurality of events comprises:
deleting one or more of the plurality of events that correspond to one or more event identifiers provided by the request to modify data.

11. The method as recited in claim 9, wherein individual events of the plurality of events comprise an event identifier that uniquely identifies the event with respect to other events of the plurality of events, and wherein deleting one or more of the plurality of events comprises:
deleting one or more of the plurality of events that correspond to a range of event identifiers provided by the request to modify data.

12. The method as recited in claim 6, wherein performing the transformation on the modified data to generate the updated version of the parent data set instance comprises:
selecting, based on one or more criteria, a query engine from among a plurality of available query engines to perform the transformation.

13. The method as recited in claim 12, wherein performing the other transformation on the updated version of the parent data set instance to generate the updated version of the child data set instance comprises:
selecting, based on one or more criteria, a different query engine from among a plurality of available query engines to perform the other transformation.

14. The method as recited in claim 6, wherein the data set lineage metadata further indicates that a current version of an additional child data set instance is derived from the current version of the child data set instance based on an additional transformation, and further comprising:
identifying, based on the data set lineage metadata, the additional transformation to be performed on the updated version of the child data set instance to generate an updated version of the additional child data set instance; and
in response to identifying the additional transformation, performing the additional transformation on the updated version of the child data set instance to generate the updated version of the additional child data set instance.

15. One or more non-transitory computer-accessible storage media storing program instructions that when executed on or across one or more processors cause the one or more processors to:
receive a request to modify a current version of a parent data set instance, wherein data set lineage metadata indicates the current version of the parent data set instance is derived from data based on a transformation and a current version of a child data set instance is derived from the current version of the parent data set instance based on another transformation;
in response to the request, modify the current version of the parent data set instance to generate an updated version of the parent data set instance;
identify, based on the data set lineage metadata, the other transformation to be performed on the updated version of the parent data set instance to generate an updated version of the child data set instance;
in response to the identification of the other transformation and subsequent to the generation of the updated version of the parent data set instance by performance of the transformation on the modified data, perform the other transformation on the updated version of the parent data set instance to generate the updated version of the child data set instance to propagate the modification of the parent data set instance to the child data set instance according to the other transformation indicated by the data set lineage metadata,
wherein the transformation performed on the modified data to generate the updated version of the parent data set instance is a different transformation than the other transformation subsequently performed on the updated version of the parent data set instance to generate the updated version of the child data set instance, and
providing, to an application, at least a portion of the updated version of the child data set instance for viewing by a user.

16. The one or more storage media as recited in claim 15, wherein the program instructions when executed on or across the one or more processors further cause the one or more processors to:
receive a selection of a plurality of transformations to define a transformation pattern; and
store the transformation pattern.

17. The one or more storage media as recited in claim 16, wherein the program instructions when executed on or across the one or more processors further cause the one or more processors to:
receive a request to schedule the transformation pattern to be run on one or more data sources; and
schedule the transformation pattern to be run on the one or more data sources.

18. The one or more storage media as recited in claim 15, wherein the current version of a parent data set instance comprises a plurality of events, and wherein to modify the current version of the parent data set instance to generate an updated version of the parent data set instance, the program instructions when executed on or across the one or more processors further cause the one or more processors to:
append data to one or more of the plurality of events, or add one or more new events to the current version of the parent data set.

19. The one or more storage media as recited in claim 18, wherein individual events of the plurality of events comprise an event identifier that uniquely identifies the event with respect to other events of the plurality of events, and wherein to append data to one or more of the plurality of events, the program instructions when executed on or across the one or more processors further cause the one or more processors to:
append the data to the one or more of the plurality of events that correspond to one or more event identifiers provided by the request to modify the current version of the parent data set instance.

20. The one or more storage media as recited in claim 15, wherein the program instructions when executed on or across the one or more processors further cause the one or more processors to:
  receive, from a user, a specification of the transformation;
  receive, from the user, a specification of the other transformation; and
  store the transformation and the other transformation, wherein the transformation and the other transformation are available for selection by users to apply to data set instances to generate child data set instances.

* * * * *